United States Patent
Hehl

(10) Patent No.: US 6,447,284 B1
(45) Date of Patent: Sep. 10, 2002

(54) MOLD CLOSURE UNIT FOR AN INJECTION MOLDING MACHINE

(76) Inventor: Karl Hehl, Arthur-Hehl-Strasse 32, D-72290 Lossburg (DE)

(*) Notice: Subject to any disclaimer, the term of this patent is extended or adjusted under 35 U.S.C. 154(b) by 0 days.

(21) Appl. No.: 09/554,401

(22) PCT Filed: Nov. 4, 1998

(86) PCT No.: PCT/EP98/07037

§ 371 (c)(1),
(2), (4) Date: May 11, 2000

(87) PCT Pub. No.: WO99/24235

PCT Pub. Date: May 20, 1999

(30) Foreign Application Priority Data

Nov. 12, 1997 (DE) .......................... 197 50 057

(51) Int. Cl.⁷ ............................................. B29C 45/67
(52) U.S. Cl. .................... 425/590; 425/589; 425/595
(58) Field of Search ................... 425/590, 149, 425/150, 589, 593, 595, 450.1

(56) References Cited

U.S. PATENT DOCUMENTS

| | | | | |
|---|---|---|---|---|
| 3,156,014 A | * | 11/1964 | Wenger ........................ | 425/595 |
| 3,712,774 A | | 1/1973 | Parker .......................... | 425/154 |
| 3,892,509 A | * | 7/1975 | Ruegg ......................... | 425/450.1 |
| 3,910,736 A | | 10/1975 | Stachelin et al. ............ | 425/450 |
| 4,230,442 A | * | 10/1980 | Rees et al. ................... | 425/150 |
| 4,865,536 A | * | 9/1989 | Inaba et al. .................. | 425/589 |

FOREIGN PATENT DOCUMENTS

| | | |
|---|---|---|
| DE | 44 11 651 C1 | 4/1995 |
| DE | 195 36 565 A1 | 4/1997 |
| EP | 0 674 985 A1 | 10/1995 |
| JP | 02 045111 A | 2/1990 |
| JP | 02 121807 A | 5/1990 |

* cited by examiner

Primary Examiner—James P. Mackey
Assistant Examiner—Thu Khanh T. Nguyen
(74) Attorney, Agent, or Firm—Cantor Colburn LLP

(57) ABSTRACT

The invention relates to a mold closure unit for an injection molding machine comprising a first device provided for moving the moveable mold support on the stationary mold support in a direction to and from said stationary mold support. By connecting a second device, the first device comes in contact with its rotatable element and is decoupled from the induction flux. Additional inductions produced by the second device are transmitted to the moveable mold support via a force transmission element which is in the form of a pressure pipe. A switching chamber designed as a decoupling means which can be actuated by a hydraulic medium is arranged between the force transmission element and the supporting element, whereby, similar to the second device, the pressure in the switching chamber can be switched in any manner. As a result, a switchable transition between the first device and the second device is obtained.

11 Claims, 4 Drawing Sheets

MOLD CLOSURE UNIT FOR AN INJECTION MOLDING MACHINE

REFERENCE TO RELATED APPLICATIONS

The present invention claims the priority of the German patent application 197 50 057.9-16 dated Dec. 11, 1997, the disclosure of which is also made expressly the subject matter of the present invention.

TECHNICAL FIELD

The invention relates to a mold-closing unit for an injection molding machine for processing plastic materials and other plasticisable masses such as e.g. ceramic masses, powdery masses and the like.

BACKGROUND OF THE INVENTION

From Patent Abstract of Japan, vol. 14 no. 206 (M-0967) and the associated JP 02.045111A is known a device which can also be used, for example, for serial closing in connection with a mold closing unit. First, with a first device, a mobile mold carrier is transferred roughly until the closure of the mold with the stationary mold carrier, whilst the actual locking pressure is then applied by an additional device. As the first device, a shaft is provided which is mounted rotatable in relation to a supporting element. Via a second device, additional forces can be transmitted via the shaft. In order here to decouple as far as possible the force-transmitting threaded parts from the force flux, a switching chamber is disposed between supporting element and the force transmission element. If the switching chamber is placed under pressure, the rotation of the shaft is halted and the pressure transmitted via the shaft itself as the force transmission element. The switching chamber can admittedly be influenced as desired in order to obtain any freely switchable transition between the first and second devices before or after the mold halves come into contact with one another, such that the transition is no longer dependent on the position of the first device. Similarly, the spacing between the parts coming into contact with one another can be eliminated at any time independently of an additionally necessary deformation. What is ensured there, however, is merely that the shaft no longer rotates; the drive components are nevertheless subjected to all the forces.

From EP-A 674 985 is known a mold-closing unit in which serial closing is realized. In order to decouple the first device and more especially the spindle drive used there from the force flux occurring during the building up of the locking forces, according to FIG. 2 there, resilient restraining means in the form of springs are provided. When a pre-determined force is exceeded, the latter ensure that the spindle drive is secured against passive reverse rotation and the forces no longer burden the drive of the first device. The springs provided for this purpose have predetermined unalterable spring powers such that, once the springs have been fitted, the first device has to summon up the predetermined force independently of the injection part or of the other machine parameters. This force would only be alterable by exchanging the springs serving as decoupling means for softer or harder springs. Only when the force of the restraining means is overcome by the second device and thus a deformation necessary for this has occurred, do these restraining means have no more influence on the locking pressure, such that only from this point in time does the locking pressure become controllable and adjustable. Without a counter-force necessary for the deformation, decoupling of the first device and thus a transition to the second device cannot take place.

From U.S. Pat. No. 3,712,774 is known a hydraulic mold height adjusting device in which, behind a toggle lever mechanism, a bearing arrangement of the toggle lever mechanism is moveable hydraulically in the closing direction. The system can then be held tight in a once fixed position. Serial closing or influencing of the locking pressure does not result from this.

From U.S. Pat. No. 3,910,736 is known for a toggle lever a bearing arrangement of the force transmission elements, configured as bars, in hydraulic pads. The pressure in these hydraulic pads is adjustable and can, when exceeded, be relieved via a back-pressure valve. These pressure pads are intended to apply the locking force such that admittedly serial closing can take place if necessary but decoupling of the first device is not possible for the simple reason that the hydraulic pads are disposed on the side of the mold-closing unit opposite the toggle lever mechanism.

SUMMARY OF THE INVENTION

Proceeding from this prior art, the object underlying the present invention is to further develop a mold-closing unit of the type mentioned initially in such a way that optimal adaptation of the components to the respective requirements is rendered possible.

A mold-closing unit for an injection molding machine for processing plastic materials and other plasticisable masses is provided. The mold-closing unit includes: a stationary mold carrier; a mobile mold carrier; a mold tentering space formed between the mobile mold carrier and the stationary mold crier and adapted to receive parts of a mold; a first device for electromechanically moving the mobile mold carrier to and from the stationary mold carrier, with at least one rotatable element and a non-rotatable element co-operating therewith; a second device capable of being actuated after the first one, during the closure of the mold to build up the locking pressure; at least one supporting element to support at least the first device and connected to the stationary mold carrier by transmission elements, after actuation of the first device, the parts of the mold being at least almost in abutment as the mold is being closed, whilst the second device is provided mainly to build up the locking pressure on actuation; the rotatable element of the first device being mounted rotatable under the effect of a decoupling means and, as the locking pressure is built up by the second device the rotatable element abuts against one of the parts, comprising supporting element, non-rotatable elements of the first device or mobile mold carrier, wherein the rotatable element is decoupled from the force flux; a force transmission element to transmit the forces arising as the locking pressure is built up to the mobile mold carrier; a switching chamber, configured as the decoupling means and capable of being actuated by a hydraulic medium, being disposed between the force transmission element and either the supporting element or the mobile mold carrier, which switching chamber enables under pressure the rotation of the rotatable element, the pressure of the hydraulic medium in the switching chamber is freely actuatable, allowing a switchable transition between the first device and the second device; and a pressure pipe, configured as the force transmission element, lay overcoming a spacing, maintained by the switching chamber which is actuated by pressure, comes into contact with a spindle head of a shaft which is configured as the rotatable element of the first device.

In order to decouple the first device from the forces, which arise during the mold closure, an additional pressure pipe is now provided. If the spacing maintained by the switching chamber which is actuated by pressure is eliminated, not only is the shaft brought to a halt, simultaneously the pressure pipe is now used as an additional force transmission element. By this means, the pressure pipe can be dimensioned to the considerably higher forces which are necessary when the mold is closed, whilst the shaft can be dimensioned to the lower forces which occur as the mold is being closed and opened. The shaft is thus designed primarily to rotate as a positioning system which simultaneously contributes to reducing the masses to be moved in a rotatory manner. The force applied in the switching chamber positions the first device but can also equalize dynamic travel forces which occur during the movement of the mobile mold carrier.

DETAILED DESCRIPTION OF PREFERRED EMBODIMENTS

The invention will now be explained by way of example with reference to the attached drawings. However, the embodiments are merely examples which are not intended to restrict the inventive concept to a specific physical arrangement.

Figure 1:
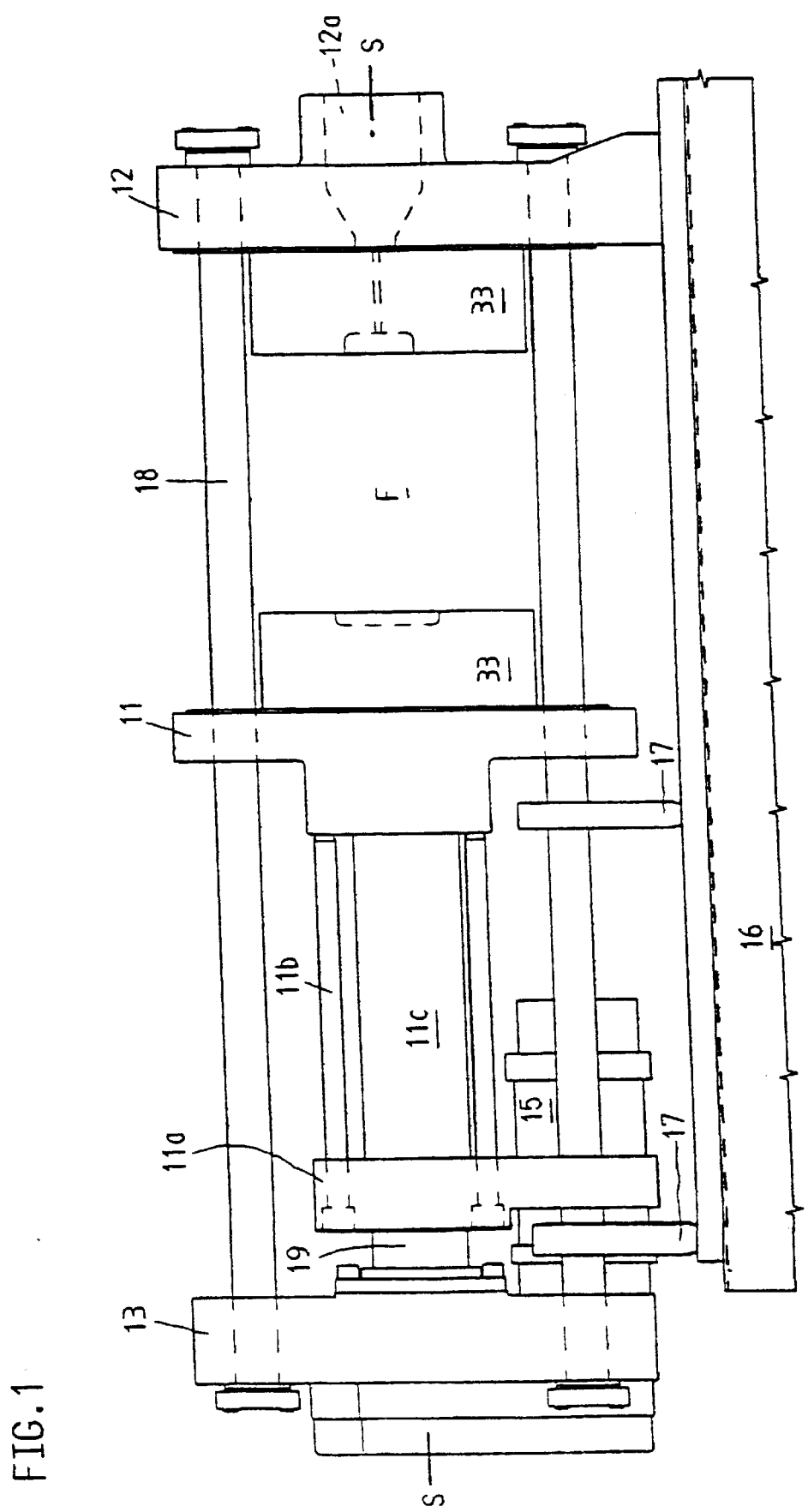
FIG. 1 a side view of the mold-closing unit located on the machine base of an injection molding machine, FIG. 2 an enlarged detail, partially in section, from FIG. 1 in the region of the drive devices, FIG. 3 an enlarged detail from FIG. 2 in the region of the bearing arrangement of the first device and in the region of the spindle head, FIG. 4 a view as per FIG. 2 of a further embodiment with drives arranged on the mobile mold carrier.

FIG. 1 shows the mold-closing unit, disposed on the machine base 16, of an injection molding unit which, by means of an injection molding unit not represented in the drawings, injects plastics materials and other plasticisable materials, such as e.g. ceramic masses, powdery masses, through an aperture 12a of the stationary mold carrier 12 into the mold cavity of a mold 33. Cooperating with the stationary mold carrier 12 there is a mobile mold carrier 11, a mold tentering space F being formed between the two mold carriers to receive a mold.

A first device 30 is provided to move the mobile mold carrier 11 to and from the stationary mold carrier 12. A second device, in this embodiment the pressure chamber 40, is provided which is actuated after the first device and during the closure of the mold 33, in order to build up the locking pressure. Thus the first device 30 brings the parts of the mold 33 already almost into contact, whilst the second device is provided mainly to build up the locking pressure on actuation. Since, on actuation of the second device, at the same time the distance a becomes zero, the first device is prevented from a further rotation of the rotatable element, here the shaft 21 with spindle head 27, such that this drive is secured against passive reverse rotation.

In order to make possible to the first device 30 the movement of the mobile mold carrier, this device is supported on at least one supporting element 13 a plurality of elements can also be provided the one beside the other. This supporting element 13 is connected to the stationary mold carrier 12 by means of transmission means, in this embodiment by means of the bars 18. The mobile mold carrier 11 is guided on the bars 18. Alternatively, a force transmission means, known per se, can be provided which is guided round the mold tentering space in order to produce a "bar-free" machine and thus make access to the mold tentering space F easier.

The electromechanical first device 30 comprises a non-rotatable element and the rotatable element, the ability of which to rotate is guaranteed under the action of the switching chamber 41 as a decoupling means which can be switched in any manner. As the locking pressure is built up by the second device, the rotatable element of the first device 30, after switching of the switching chamber 41 to be pressure-free or after the pre-determinable force in the switching chamber in this embodiment has been exceeded, comes to lie against a pressure pipe 19, secured against rotation by a radial locking means 46. This abutment can, with a reversal of the principle, also happen against the mobile mold carrier 11, against the supporting element 13' (FIG. 4)or against the non-rotatable element of the first device. Through this abutment it is ensured that the rotatable element is no longer rotatable as further forces are built up, such that the first device 30 is secured against passive reverse rotation and the drive motor 15 of the first device is no longer influenced by this as further forces are applied. The rotatable element, in this embodiment the shaft 21, is thus decoupled from the force flux in terms of both rotatory and translatory motion. The pressure pipe 19 is provided as the force transmission element in order nevertheless to transmit the forces occurring nevertheless as the locking pressure is built up to the mobile mold carrier 11 with the interposition of e.g. spindle head 27, planets 28 and threaded bush 11c.

The switching chamber 41 which can be actuated by a hydraulic medium is disposed between the force transmission element and the supporting element 13. By influencing the pressure in the switching chamber 41 and/or the pressure chamber 40 the pre-determinable force which has to be overcome until contact is made, can be altered as required insofar as the switching chamber 41 is not switched pressure-free. The pressure column in the switching chamber 41 thus acts as required as a "variable spring". Thus e.g. the locking pressure can be controlled or adjusted, which is advantageous e.g. in influencing the mold internal pressure under the influence of the mold-closing unit. Whilst in prior art only one force limiting means was present, now a separate positioning system can be provided which is separated from the force flux as soon as the pre-determinable force from the switching chamber is achieved.

Figure 2:
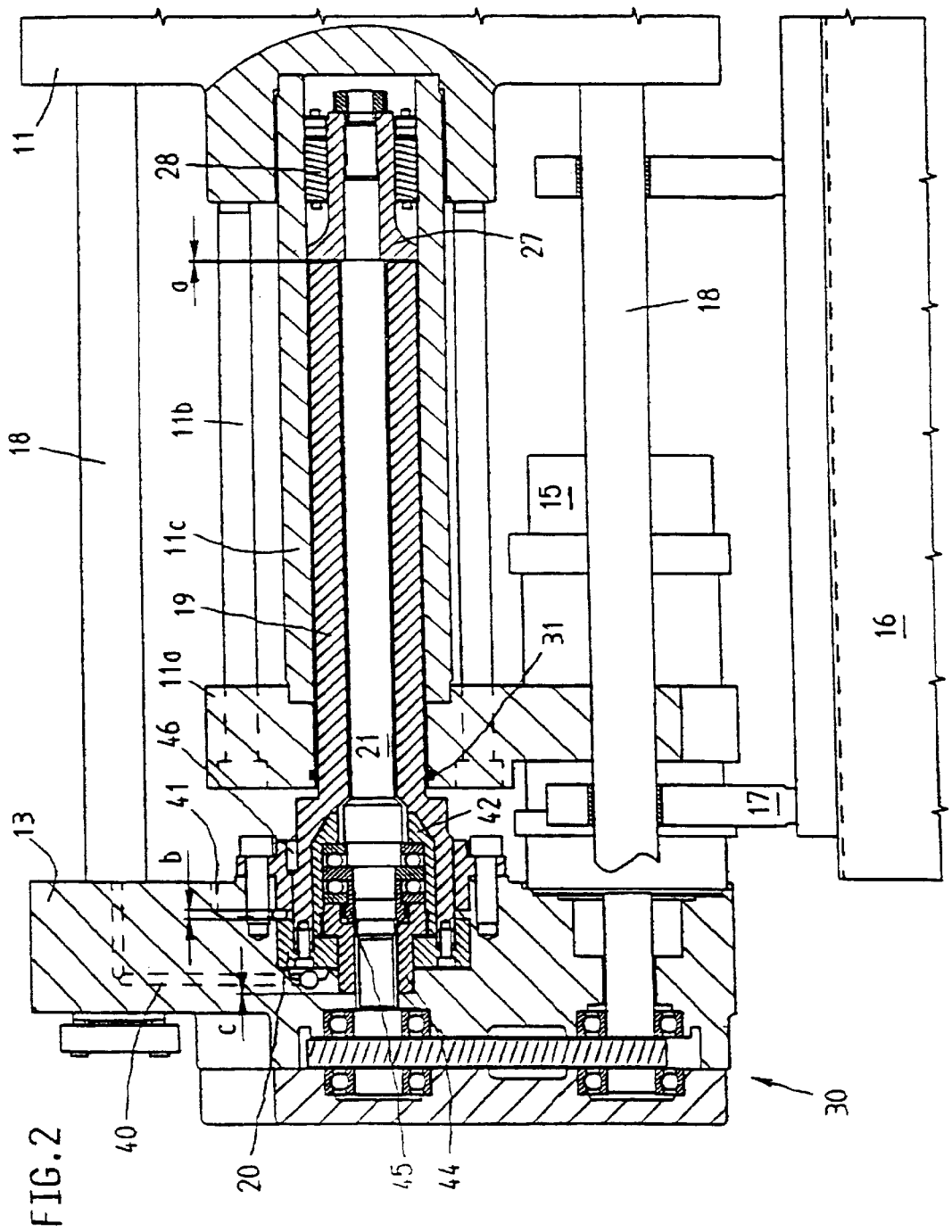

If required, the switching chamber 41 can also be disposed between the mobile mold carrier 11 and the pressure pipe 19. Moveable in common with the mobile mold carrier 11 as a constructional unit is a support element 11a which is tensioned with the movable mold carrier via bolts 11b. Between the support element 11a and the mobile mold carrier 11 is fixed a threaded bush 11c which represents the non-rotatable element of the electromechanical drive. Both support element and mobile mold carrier are guided on the bars 18, the mold-closing unit itself being supported moveable in the closing direction on additional supporting elements 17 on the machine base. The first device 30 has a shaft 21 as a rotatable element. This shaft 21 has a spindle head 27 at its right-hand end in FIGS. 2 and 3. This spindle head is surrounded by the threaded bush 11c. When the pressure in the switching chamber 41 is switched off or when the pre-determinable force from the switching chamber 41 is exceeded, the distance a between pressure pipe 19 and spindle head 27 is overcome with the use of the second device until the contact surface 27a comes to lie against the pressure pipe 19. A rotation of the rotatable element of the first device is thus only possible if the distance a is not equal to zero. As soon as the second device is connected, however, a becomes zero, at the latest when the switching chamber 41 is switched pressure-free or the pressure in the switching chamber is exceeded by the second device.

Figure 3:
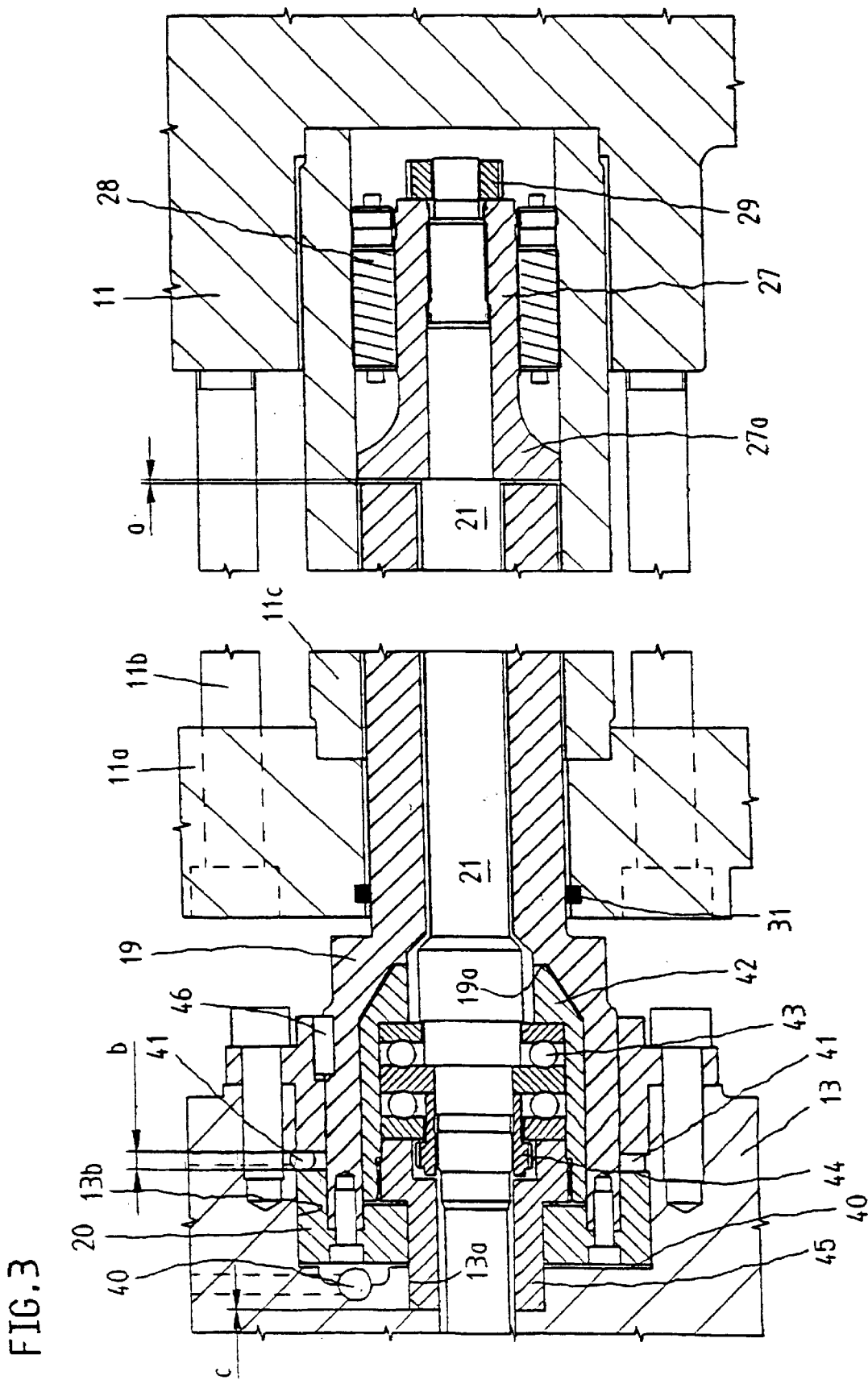

The pressure pipe 19 lies coaxially with the shaft 21. A plurality of planets 28 co-operate with the spindle head, the relative position between spindle head 27 and planets not altering on actuation. Movement happens rather in the outer region, i.e. between the planets 28 and the threaded bush 11c, which has the advantage of better force transmission as a result of the better engagement of the threads in one another. FIG. 3 makes clear that the threaded bush 11c is also coaxial both with the shaft 21 and with the pressure pipe 19, such that externally the appearance of a hydraulic drive is produced, as if a piston rod plunges into a cylinder. This design of the inwardly lying shaft 21 contributes to the protection of the shaft e.g. against dirt and also to the protection of thoughtless personnel since rotating parts are protected. Simultaneously sound-insulation is produced and lubrication can be provided in the interior. In order to protect the drive from impurities, a seal 31 is provided between supporting element 11a and the pressure pipe 19.

The force transmission element configured as a pressure pipe 19 is mounted axially moveable in the closing direction by altering the distances b and c. In the simplest case, hydraulic medium is applied to the switching chamber 41 until at c=0 a defined positioning of the final position both of the first device 30 and of the pressure pipe 19 is set and a maximum distance a is produced. On actuation of the first device, the mobile mold carrier is moved up to any gap between the mold halves or up to mold closure whereby, at the latest when the two halves of the mold abut against one another, a force and thus a deformation would appear which, in dependence on the force ratio between the switching chamber 41 and the pressure chamber 40, leads to an earlier or later reduction of the distance a between pressure pipe 19 and spindle head 27 to zero and thus to contact. Through this contact the shaft 21, and with it the spindle head 27, is prevented from further rotation. Usually, however, the pressure chamber 40 is actively connected at any location such that, regardless of whether mold closure has already been reached or not, the switching chamber 41 is relieved actively or passively.

Additional forces can now no longer be applied by the drive motor 15 and the shaft 21. Instead, either supporting element 13, as proposed in EP-A 674 985, is acted upon by a further device or, as in this embodiment, the pressure pipe can be acted upon from an additional hydraulic chamber, pressure chamber 40, in order to build up the locking forces. Here the forces are transmitted via the pressure pipe 19 to the spindle head, from the latter to the planets 28 and from these to the threaded bush 11c and thus to the mobile mold carrier 11.

The pressure pipe 19 is connected to a piston 20. The position of the pressure pipe is influenced on the one hand by the pressure of the hydraulic medium in the switching chamber 41. On the other hand, piston 20 and pressure pipe 19 are acted upon from a pressure chamber 40 configured as the second device for building up the locking pressure. Naturally, not merely one device of this type but a plurality of devices lying parallel beside one another can be provided, in order to move the mobile mold carrier and build up the locking forces. The piston 20 is an annular piston which surrounds the shaft 21 coaxially. On its one side it delimits the switching chamber 41 and on the other side the pressure chamber 40. The switching chamber 41 is furthermore delimited by the supporting element 13 and the outer side of the pressure pipe 19. The pressure chamber 40 is formed in the supporting element 13 which guides the piston 20 with a further recess 13b. Towards the center, the pressure chamber 40, configured as an annular chamber, is delimited by the tension ring 45. This tension ring 45, which to this extent is simultaneously a kind of piston rod, surrounds the shaft 21 coaxially and is for its part guided in a recess 13a of the supporting element 13.

If hydraulic medium is applied to the switching chamber 41, this leads as required to up to a spacing c=0 of the tension ring 45 on the supporting element 13. This is affected by the pressure pipe 19 moving with a contact surface 19a a bearing bush 42 connected to the tension ring 45, together with the bearings 43 located therein. For their part, the bearings 43 are fixed in relation to the shaft 21 by a slotted nut 44.

Basically, hydraulic medium can be applied simultaneously to both hydraulic chambers, i.e. switching chamber 41 and pressure chamber 40 and the pressure difference controlled or adjusted. As desired, the measurements and thus the deformations up to decoupling of the first device from the force flux or up to exact positioning can be influenced, position adjustments of the mobile mold carrier being possible in co-operation with known position measuring systems. Mostly however, during the actuation of the first device the switching chamber 41 is acted upon and switched pressure-free as soon as the distance a=0 should be produced in order also to build up the locking pressure from the pressure chamber 40. Thus the second device becomes connectable at any location which was not possible previously with the springs with predetermined spring resistance. As soon as abutment is achieved on reduction of distance a to zero, the drive motor 15 is switched to position control. If the locking forces are then built up, the distance c becomes not equal to 0 such that thus the bearing arrangement of the shaft 21 is decoupled from the force flux.

Figure 4:
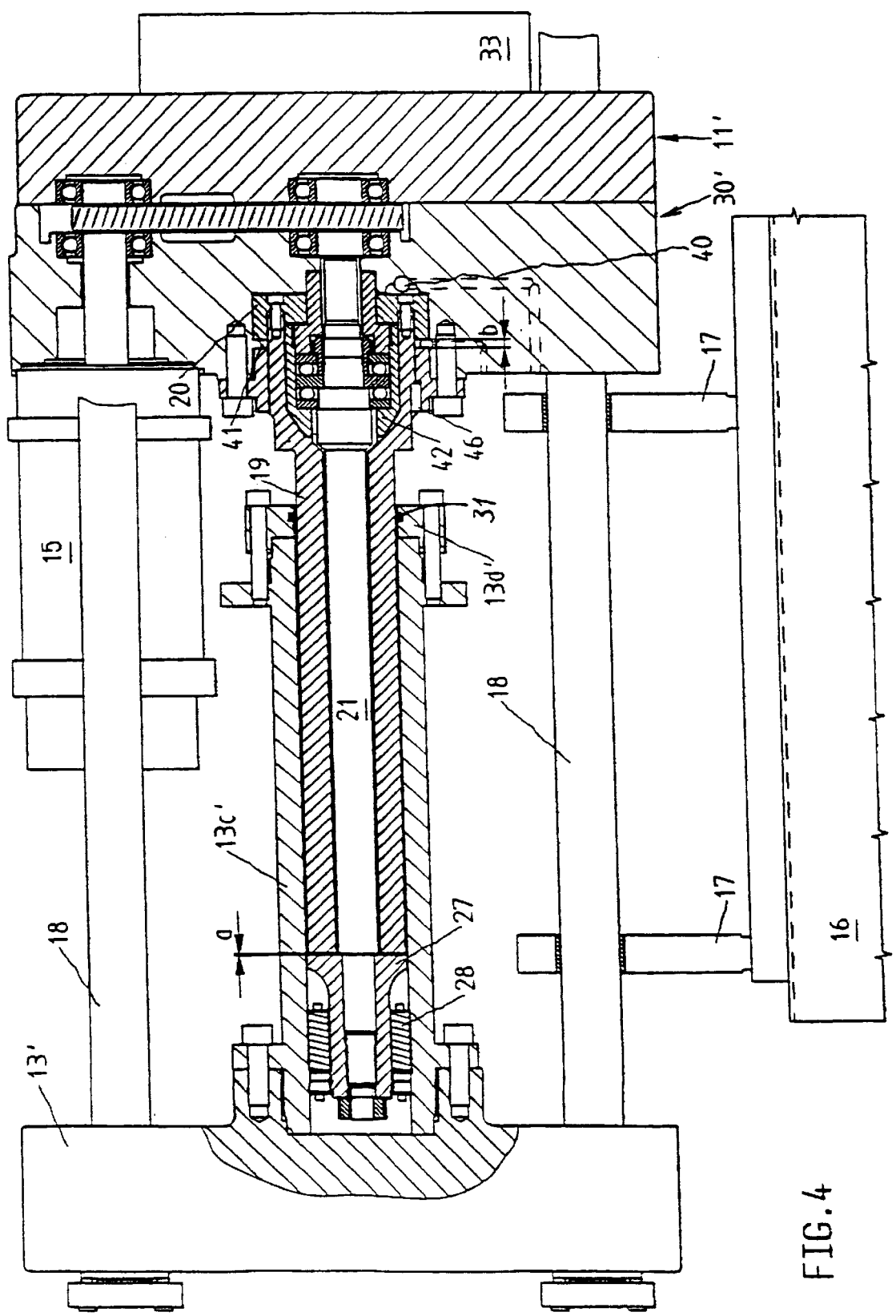

FIG. 4 shows in a further embodiment an arrangement of the drive units on the mobile mold carrier. Identical parts are referred to with the same reference numerals as in the first embodiment, similar parts having the same effect are provided with a reference number supplemented by an apostrophe. The drive motor 15 and the first device 30' are disposed on the mobile mold carrier 11'. The threaded bush 13c', secured against rotating is—in a reversal of the first embodiment—fixed on the supporting element 13' and closed by a cover 13d' bearing the seal 31 and which is penetrated by the pressure pipe 19.

Here, too, the shaft 21 is turned under actuation of the switching chamber 41 until the distance a becomes zero, whether by connecting the pressure chamber 41 of through some other effect of force. The shaft 21 with the spindle head drives the planets 28 which co-operate with the threaded bush 13c'. If the distance becomes a=0, the forces are transmitted via the pressure pipe 19.

It goes without saying that this description can be subjected to the most varied modifications, alterations and adaptations which move in the range of equivalents to the appended claims.

What is claimed is:

1. A mold-closing unit for an injection molding machine for processing plastic materials and other plasticisable masses, having
   a stationary mold carrier,
   a mobile mold carrier,
   a mold tentering space formed between the mobile mold carrie[00f8] and the stationary mold carrier and adapted to receive parts of a mold, a first device for electromechanically moving the mobile mold carrier to and from the stationary mold carrier, with at least one rotatable element and a non-rotatable element cooperating therewith, a second device capable of being actuated after the first device, during the closure of the mold to build up the locking pressure, at least one supporting element to support at least the fast device and connected to the stationary mold carrie[00f8] by transmission elements, after actuation of the first device, the parts of the mold being at least almost in abutment as the mold is being closed, whilst the second device is provided mainly to build up the locking pressure on actuation, the rotatable element of the first device being mounted rotatable under the effect of a decoupling moans and, as the locking pressure is built up by the second device the rotatable element abuts against one of the parts, comprising the supporting element the non-rotatable elements of the first device or mobile mold carrier, wherein the rotatable element is decoupled from a force flux, a force transmission element to transmit the forces arising as the locking pressure is built up to the mobile mold carrier, a switching chamber, configured as the decoupling means and capable of being actuated by a hydraulic medium, being disposed between the force transmission element and either the supporting element or the mobile mold carrier, which switching chamber enables under pressure the rotation of the rotatable element, the pressure of the hydraulic medium in the switching chamber is freely actuatable, allowing a switchable transition between the first device and the second device, and a pressure pipe, configured as the force transmission element, by overcoming a spacing, maintained by the switching chamber which is actuated by pressure, comes into contact with a spindle head of a shaft which is configured as the rotatable element of the first device.

2. A mold-closing unit according to claim 1, wherein the first device has a shaft and a threaded bush, configured as the non-rotatable element, surrounding the spindle head, and in that the pressure pipe comes into contact with the spindle head of the thereafter passive shaft.

3. A mold-closing unit according to claim 2, wherein the pressure pipe is disposed coaxial with the shaft and in that the spindle head has a rotationally symmetrical contact surface to abut against the pressure pipe.

4. A mold-closing unit according to claim 2, wherein that with the spindle head of the shaft, mounted at least indirectly on the supporting element, co-operates a plurality of planets, the position of which relative to the spindle head on actuation of the first device is substantially unalterable and which, on actuation of the first device, co-operate with the threaded bush which is fixed on the mobile mold carrier and which is disposed coaxially with the force transmission element and receives the latter in itself, at least partially.

5. A mold-closing unit according to claim 1, wherein the force transmission element, configured as the pressure pipe is mounted axially moveable in the closing direction and is connected to a piston.

6. A mold-closing unit according to claim 5, wherein the respective position of the pressure pipe is determined on the one hand by the pressure of the hydraulic medium in the switching chamber, and in that the piston, on the other hand, is actuated from a pressure chamber, configured as the second device for building up the locking pressure and which produces the abutment.

7. A mold-closing unit according to claim 5, wherein the piston is an annular piston coaxially surrounding the shaft configured as a rotatable element, which piston delimits on its one side the switching chamber and on the other side the pressure chamber.

8. A mold-closing unit according to claim 7, wherein the piston is held on a piston rod configured as a tension ring, which rod surrounds the shaft coaxially and is guided in a recess of the supporting element.

9. A mold-closing unit according to claim 6, wherein the pressure chamber is formed in the supporting element, which simultaneously guides the piston with a further recess, and in that the pressure chamber is delimited centrally by a piston rod configured as a tension ring.

10. A mold-closing unit according to claim 5, wherein when the hydraulic medium from the switching chamber is applied to the piston, the pressure pipe abuts with one contact surface against a bearing bush connected to the tension ring in such a way that the tension ring strikes against the supporting element.

11. A mold-closing unit according to claim 6, wherein when the pressure chamber is actuated, the switching chamber can be switched pressure-free.

* * * * *